(12) United States Patent
White et al.

(10) Patent No.: US 10,061,685 B1
(45) Date of Patent: Aug. 28, 2018

(54) SYSTEM, METHOD, AND COMPUTER PROGRAM FOR HIGH VOLUME TEST AUTOMATION (HVTA) UTILIZING RECORDED AUTOMATION BUILDING BLOCKS

(71) Applicant: Amdocs Development Limited, Limassol (CY)

(72) Inventors: Svend White, Champaign, IL (US); Ammar Bhutta, Savoy, IL (US); Yaron Weiss, Champaign, IL (US); Nathan Chittenden, Fort Worth, TX (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 104 days.

(21) Appl. No.: 15/253,691

(22) Filed: Aug. 31, 2016

(51) Int. Cl.
  *G06F 11/00* (2006.01)
  *G06F 11/36* (2006.01)
(52) U.S. Cl.
  CPC ...... *G06F 11/3684* (2013.01); *G06F 11/3664* (2013.01); *G06F 11/3688* (2013.01); *G06F 11/3692* (2013.01)
(58) Field of Classification Search
  USPC ....................................... 714/38.1
  See application file for complete search history.

(56) References Cited

U.S. PATENT DOCUMENTS 5,542,043 A  7/1996 Cohen et al.
6,889,158 B2  5/2005 Penov et al.
(Continued)

FOREIGN PATENT DOCUMENTS

WO  2012063070 A1  5/2012

OTHER PUBLICATIONS

Tilley, S. and Parveen, T., "Software Testing in the Cloud: Migration and Execution" Springer Briefs in Computer Science, 2012, Chapter 2: SMART-T: Migrating Testing to the Cloud, pp. 19-35.
(Continued)

*Primary Examiner* — Sarai E Butler
(74) *Attorney, Agent, or Firm* — Zilka-Kotab, PC

(57) ABSTRACT

A system, method, and computer program product are provided for High Volume Test Automation (HVTA) utilizing recorded automation building blocks. In operation, a testing system identifies at least one HVTA test to perform on a system under test as part of a testing project based on an existing set of tests. The testing system identifies a plurality of generic test functions in an automation repository that are applicable to the at least one HVTA test that has been identified by the testing system as relevant. Additionally, the testing system identifies dependency rules associated with the plurality of generic test functions. Further, the testing system generates at least one test flow utilizing the plurality of generic test functions, based on the dependency rules associated with the plurality of generic test functions. In addition, the testing system organizes an overall test sequence for the at least one HVTA test including the at least one test flow, based on a type of HVTA test to be performed. Moreover, the testing system executes the overall test sequence while monitoring a testing environment of the system under test in real time. The testing system reports anomalies resulting from monitoring the testing environment of the system under test during the execution of the overall test sequence.

20 Claims, 6 Drawing Sheets

(56) References Cited

U.S. PATENT DOCUMENTS

| | | | | |
|---|---|---|---|---|
| 7,142,002 B1* | 11/2006 | Clemons | | G01R 31/2893 324/750.25 |
| 7,801,703 B2* | 9/2010 | Marvasti | | G06N 99/005 702/181 |
| 8,019,049 B2 | 9/2011 | Allen, Jr. et al. | | |
| 8,201,023 B2 | 6/2012 | Chen | | |
| 8,381,197 B2 | 2/2013 | Meenakshisundaram et al. | | |
| 8,473,913 B2 | 6/2013 | Noller et al. | | |
| 8,898,639 B2 | 11/2014 | Lawrance et al. | | |
| 2005/0042999 A1* | 2/2005 | Rappaport | | H04B 1/719 455/307 |
| 2006/0075305 A1* | 4/2006 | Robinson | | G06F 11/3684 714/38.1 |
| 2006/0212741 A1* | 9/2006 | Conklin | | H04L 43/50 714/4.1 |
| 2007/0061781 A1 | 3/2007 | Bryan | | |
| 2009/0077538 A1 | 3/2009 | Keyes | | |
| 2009/0100297 A1* | 4/2009 | Srinivasan | | G06F 11/277 714/43 |
| 2009/0222694 A1* | 9/2009 | Adir | | G06F 11/261 714/26 |
| 2009/0300422 A1* | 12/2009 | Grichnik | | G05B 23/024 714/37 |
| 2010/0146338 A1* | 6/2010 | Schalick | | G06F 11/3648 714/33 |
| 2010/0281467 A1 | 11/2010 | Arteaga et al. | | |
| 2011/0035629 A1* | 2/2011 | Noller | | G06F 11/3688 714/38.14 |
| 2012/0030654 A1 | 2/2012 | Park et al. | | |
| 2012/0311392 A1* | 12/2012 | Agrawal | | G06F 11/36 714/738 |
| 2013/0042151 A1 | 2/2013 | McCoy et al. | | |
| 2015/0100832 A1* | 4/2015 | Nanjundappa | | G06F 11/3688 714/38.14 |
| 2015/0317241 A1* | 11/2015 | Akiyama | | G06F 11/3684 714/38.1 |
| 2016/0085665 A1* | 3/2016 | Junker | | G06F 11/3684 714/38.1 |
| 2016/0140006 A1* | 5/2016 | Siva | | G01R 31/31727 714/33 |
| 2016/0162389 A1* | 6/2016 | Lachwani | | G06F 11/3664 714/38.14 |
| 2016/0170860 A1* | 6/2016 | Angermayer | | G06F 11/362 717/126 |
| 2017/0068607 A1* | 3/2017 | Herzi | | G06F 11/327 |

OTHER PUBLICATIONS

Kaner, C., "An Overview of High Volume Automated Testing," Workshop on Teaching Software Testing, Jan. 2013, pp. 1-5, retrieved from http://kanercom/?p=278.

Kaner, C. et al., "High Volume Test Automation," Oct. 2003, pp. 1-39, retreived from http://kaner.com/pdfs/highvolCSTER.pdf.

Kaner, C. et al., "How to Actually Do High Volume Automated Testing," STAR East, Apr. 30, 2013, pp. 1-53, retrieved from http://kaner.com/pdfs/StarHiVAT2013KanerOliverFioravantiFinal.pdf.

* cited by examiner

SYSTEM, METHOD, AND COMPUTER PROGRAM FOR HIGH VOLUME TEST AUTOMATION (HVTA) UTILIZING RECORDED AUTOMATION BUILDING BLOCKS

FIELD OF THE INVENTION

The present invention relates to software testing, and more particularly to efficiently generating High Volume Test Automation (HVTA) tests utilizing recorded automation building blocks.

BACKGROUND

High Volume Test Automation (HVTA) refers to an automated execution and evaluation of large numbers of tests, for the purpose of exposing functional errors that are otherwise hard to find. Although High Volume Test Automation testing is an effective way to expose functional errors, currently, generating such tests is time and resource intensive.

There is thus a need for addressing these and/or other issues associated with the prior art.

SUMMARY

A system, method, and computer program product are provided for High Volume Test Automation (HVTA) utilizing recorded automation building blocks. In operation, a testing system identifies at least one HVTA test to perform on a system under test as part of a testing project based on an existing set of tests. The testing system identifies a plurality of generic test functions in an automation repository that are applicable to the at least one HVTA test that has been identified by the testing system as relevant. Additionally, the testing system identifies dependency rules associated with the plurality of generic test functions. Further, the testing system generates at least one test flow utilizing the plurality of generic test functions, based on the dependency rules associated with the plurality of generic test functions. In addition, the testing system organizes an overall test sequence for the at least one HVTA test including the at least one test flow, based on a type of HVTA test to be performed. Moreover, the testing system executes the overall test sequence while monitoring a testing environment of the system under test in real time. The testing system reports anomalies resulting from monitoring the testing environment of the system under test during the execution of the overall test sequence.

DETAILED DESCRIPTION

Figure 1:
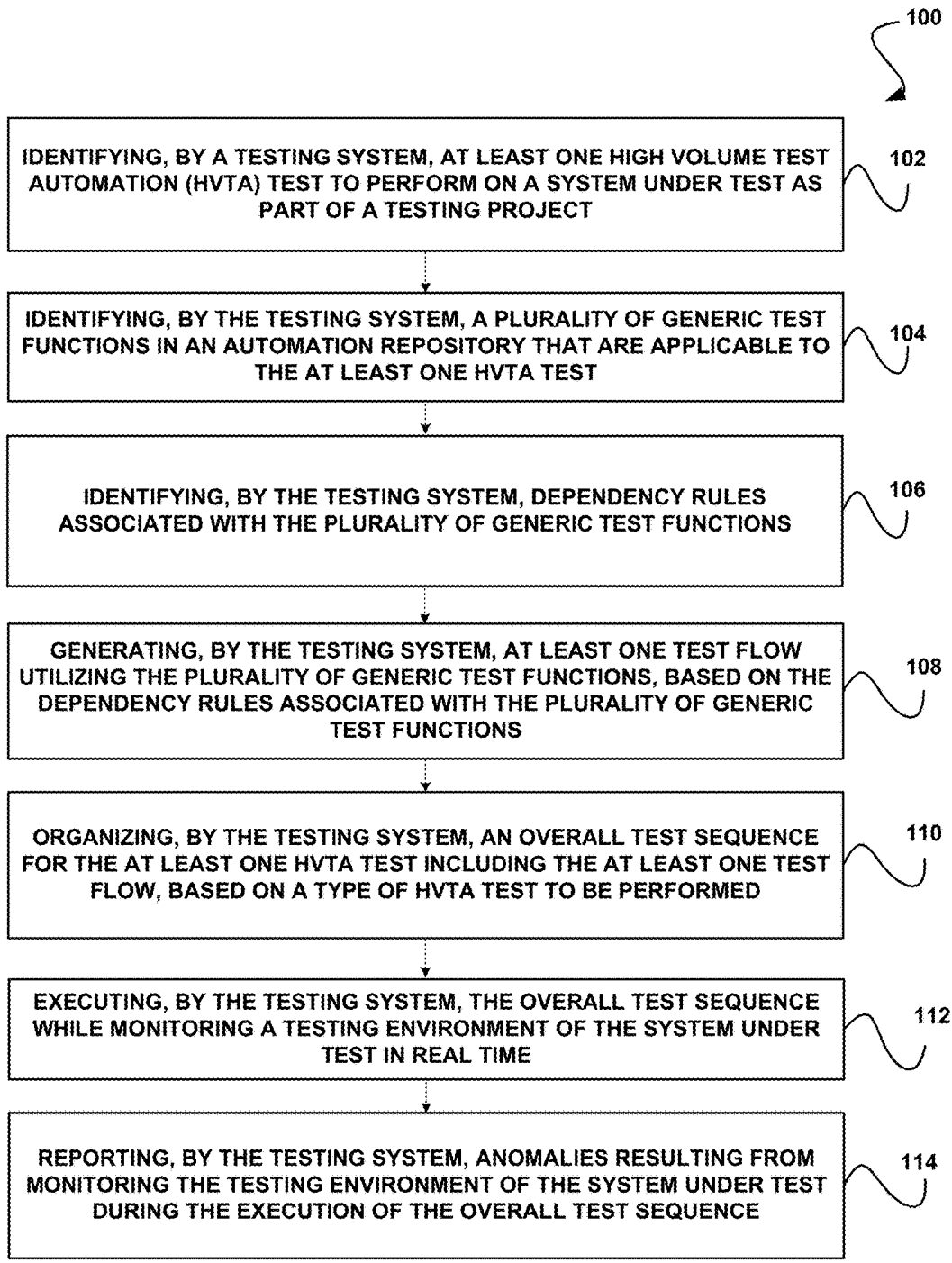
FIG. 1 illustrates a method for High Volume Test Automation (HVTA) utilizing recorded automation building blocks, in accordance with one embodiment.

FIG. 1 illustrates a method 100 for High Volume Test Automation (HVTA) utilizing recorded automation building blocks, in accordance with one embodiment.

As shown, a testing system identifies at least one HVTA test to perform on at least one system under test as part of a testing project. See operation 102. It should be noted that the system under test may include one or more systems and/or one or more applications/computer code, etc. Furthermore, the system under test may refer to hardware and/or software being tested.

The HVTA test may include a variety of different tests, individually or in combination. For example, the HVTA test may include one or more of: extended random regression testing; function equivalence testing (comparison to a reference function); comparison to a computational or logical model; comparison to a heuristic prediction, such as prior behavior; utilizing a simulator with probes; state-transition testing without a state model; state-transition testing using a state model (e.g. terminate on failure rather than after achieving some coverage criterion); functional testing in the presence of background stress; hostile data stream testing; and/or utilizing random inputs to protocol checkers.

The testing system identifies a plurality of generic test functions in an automation repository that are applicable to the at least one HVTA test. See operation 104. The generic test functions include pre-recorded automation building blocks.

The generic test functions may include automated test functions from tests that have been executed manually or created manually by a tester. The testing system may access the test functions via one or more repositories. In one embodiment, the test functions may be categorized as either an application-specific function or a generic function that can be used with multiple or any application.

Additionally, the testing system identifies dependency rules associated with the plurality of generic test functions. See operation 106. The dependencies may include internal or external dependencies, etc.

Further, the testing system generates at least one test flow utilizing the plurality of generic test functions, based on the dependency rules associated with the plurality of generic test functions. See operation 108.

In various embodiments, generating the test flow utilizing the plurality of generic test functions may include combining two or more of the generic test functions into the test flow utilizing at least one of a test scenario template or one or more test scenario build up rules. In one embodiment, generating the test flow may include generating all test scenario combinations for a given set of the generic test functions. Additionally, in one embodiment, generating the test flow may include generating a strategic subset from all the test scenario combinations through combinatorial testing.

In one embodiment, the method 100 may further include identifying, by the testing system, a plurality of data parameters to be utilized during execution of the test flow. In this case, a set of parameter-combining rules may be utilized for identifying the plurality of data parameters.

In addition, the testing system organizes an overall test sequence for the at least one HVTA test including the at least one test flow, based on a type of HVTA test to be performed. See operation 110. For example, if the type of HVTA test includes extended random regression testing or function equivalence testing, etc., the overall test sequence would be organized accordingly, based on these test types.

Moreover, the testing system executes the overall test sequence while monitoring a testing environment of the system under test in real time. See operation 112. The testing system reports anomalies resulting from monitoring the testing environment of the system under test during the execution of the overall test sequence. See operation 114. The anomalies may be reported in various ways, including via a user interface associated with the testing system and/or by sending alerts, etc.

The anomalies may include, for example, any lower level failures or causes for concern during testing. Examples of such errors may include memory leaks, resource utilization issues, and stack overflows. The monitoring may include monitoring the testing environment in real time and also comparing current diagnostic data against previously saved diagnostic data in order to flag potential correlations.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
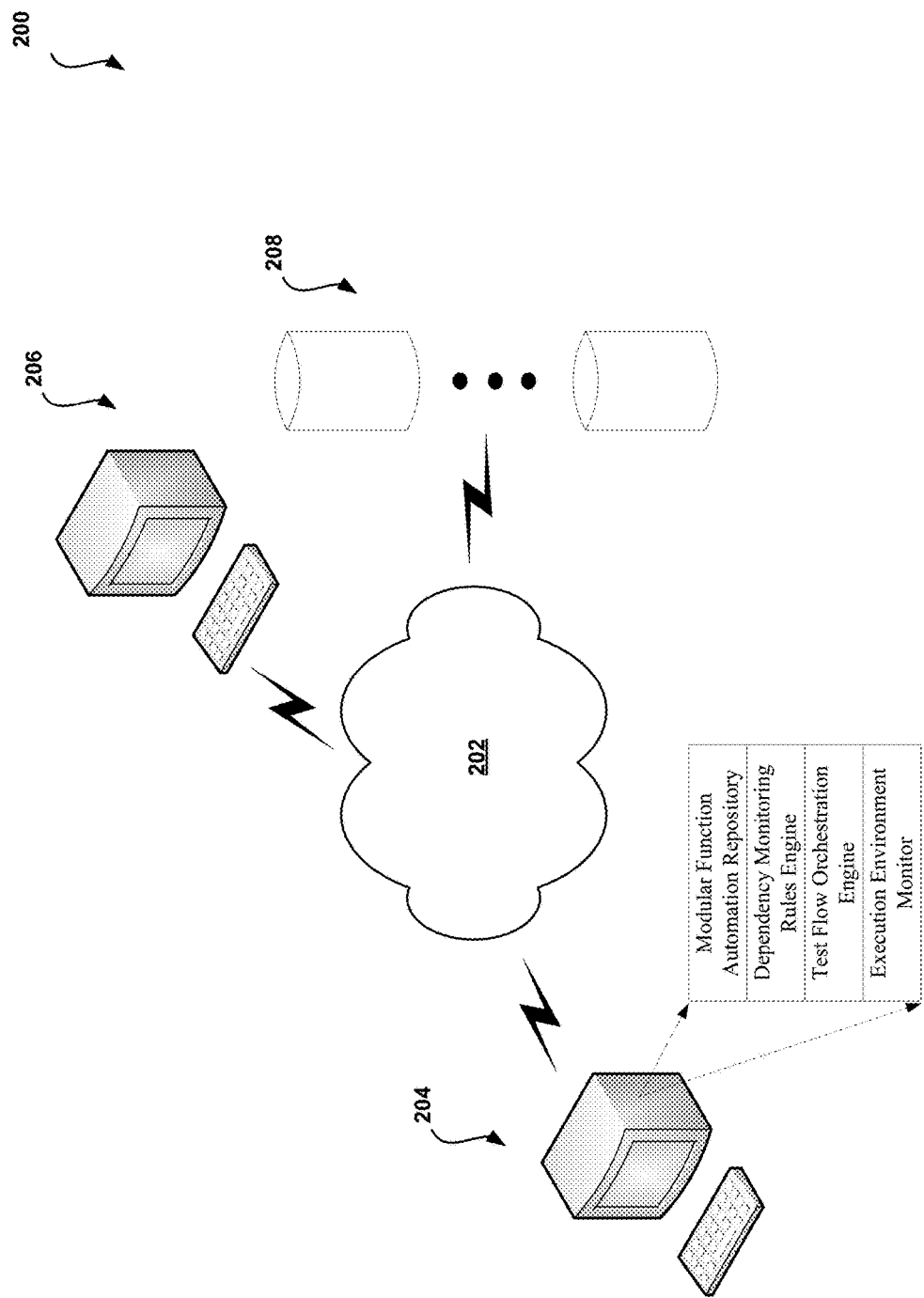
FIG. 2 shows a system for HVTA utilizing recorded automation building blocks, in accordance with one embodiment.

FIG. 2 shows a system 200 for High Volume Test Automation utilizing recorded automation building blocks, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a testing system 204 including a variety of testing tools. The testing system 204 is in communication with a system under test 206, either directly, or over one or more networks 202. The testing system 204 is also in communication with one or more test repositories 208, which may include a Modular Function Automation Repository.

There are several tools that can automate a functional test flow, by automation of small activities (i.e. test cases) and by attaching the activities to create a test scenario (i.e. a test flow). Some of these tools even permit parameters in the activities definition, which may be populated when running the automation. Some of these tools include test success indicators within activities.

The testing system 204 leverages the option of automated activities. The testing system 204 implements an algorithm and a tool that may have the capability to automatically create all scenario combinations for a given set of activities and executes them using High Volume Test Automation (HVTA) or to automatically create a strategic subset of that total test set range through combinatorial testing. The testing system 204 may, in various embodiments, combine activities into a scenario by scenario templates and/or scenario build up rules. The testing system 204 may perform parameter selection by utilizing a set of parameter combining rules.

In various embodiments, the testing system 204 enables mass-automation of all test possibilities per a given set of activities or a strategic subset of that total test set range through combinatorial testing.

In general, HVTA refers to an automated execution and evaluation of large numbers of tests, for the purpose of exposing functional errors that are otherwise hard to find. This type of testing approach recognizes that a given test case may execute successfully a number of times, suddenly failing only after prolonged period of execution.

HVTA is effective for finding defects caused by system components interacting in unanticipated ways, exhibiting race conditions or even deadlock, system resourced corruption, memory leaks, inaccurate internal closes, counters, as well as other state-based components, or simply overflow. Using HVTA, the reliability of software that works for long duration without stopping is increased because of the ability for this technique to find specific types of errors much better than most traditional test techniques.

HVTA is a less commonly employed testing methodology that can expose types of software bugs that are particularly difficult to uncover using conventional regression testing. In fact, this class of defects is often a challenge to even reproduce after detailed bug reports have been filed.

The testing system 204 facilitates and encourages all types of HVTA tests by organizing and transforming conventional test scripts for use in HVTA. The testing system 204 may implement various sub-systems to facilitate this process automation, including: a Modular Function Automation Repository; a Dependency Monitoring Rules Engine; a Test Flow Orchestration Engine; and an Execution Environment Monitor. In various embodiments, each of these sub-systems (and the testing system 204) may implement or include various computer programs, applications, code, logic, processors, servers, memory, and/or any other software or hardware.

The testing system 204 may implement a variety of HVTA techniques and tests, including: extended random regression testing; function equivalence testing (comparison to a reference function); comparison to a computational or logical model; comparison to a heuristic prediction, such as prior behavior; utilizing a simulator with probes; state-transition testing without a state model (i.e. dumb monkeys); state-transition testing using a state model (terminate on failure rather than after achieving some coverage criterion); functional testing in the presence of background stress; hostile data stream testing; and random inputs to protocol checkers (e.g. see http://kaner.com/pdfs/highvolCSTER- .pdf).

In the context of the present description, extended random regression testing refers to the execution of previously passed regression tests in random order.

In the context of the present description, function equivalence testing refers to testing that involves comparing the result of a given test of the SUT with the result of the equivalent action(s) performed in another application containing parallel functionality, which is determined to perform correctly for these purposes. For example, one might test a feature in LibreOffice Calc by comparing to the output of the same action in Microsoft Excel. This is not to be mistaken with another black box testing technique known as "equivalence class testing."

In the context of the present description, comparison to a computational or logical model refers to employing a deterministic measure of success based on a computational model or logical model.

In the context of the present description, comparison to a heuristic prediction refers to employing a probabilistic measure of success. A common example is data from previous successful executions.

In the context of the present description, utilizing a simulator with probes refers to a technique discussed by Kaner whereby heavy, randomized regression testing is performed in tandem with temporarily added or enabled "probes" in the SUT (e.g., additional diagnostic coding is added by developers that logs behavior in greater detail).

In the context of the present description, state-transition testing without a state model refers to random testing in large volume over time focusing over the overall health of the SUT—as opposed to the typical regression testing scenario where one is focused on the success of each particular test in isolation—where transitions within the SUT are triggered without knowledge of either the SUT's state model (i.e., the total number of and expected order of states within the SUT during a particular activity) or its internal programmatic workings of the SUT. Depending on the situation, some knowledge of the SUT's general UI behavior can be assumed (e.g., clicking a button causes a change in the UI) or none at all. This is sometimes referred to as "dumb monkey testing."

In the context of the present description, state-transition testing using a state model refers to random testing in large volume over time focusing over the overall health of the SUT as opposed to the typical regression testing scenario where one is focused on the success of each particular test in isolation—where transitions within the SUT are triggered with some knowledge of the SUT's state model (i.e., the total number of and expected order of states within the SUT during a particular activity) but no knowledge of its internal programmatic workings of the SUT. This is referred to by Kaner as "smart monkey testing."

In the context of the present description, functional testing in the presence of a background stress refers to functional testing of a SUT when it is stressed in one way or another (e.g., heavy concurrent usage, overloading one or more system components, artificially inducing a failure at a particular stage programmatically).

In the context of the present description, hostile data stream testing refers to sending the SUT data in unexpected and/or invalid format (e.g., malformed XML).

In the context of the present description, utilizing random inputs to protocol checkers refers to sending the SUT inputs that are unexpected and/or invalid for a particular protocol (e.g., HTTP).

The Modular Function Automation Repository stores modular automated test functions from tests that have been executed manually or created manually by the tester. Test functions may be categorized as either an application-specific function or a generic function that can be used with multiple or any application.

Based on the categorization performed by the Rules Engine, the Modular Function Automation Repository reorganizes and/or refactors existing flows on an ongoing basis to eliminate redundancy.

The Dependency Monitoring Rules Engine monitors dependencies required for successful execution of automated test functions stored in the Modular Function Automation Repository.

The Dependency Monitoring Rules Engine may monitor various dependencies, including dependencies internal to an application. This may include, for example, steps that need to be completed in the application before executing a particular test function within the same applications, activities that can be executed in parallel, and logical dependencies, etc.

The Dependency Monitoring Rules Engine may monitor external application dependencies including steps that need to be completed in one or more applications before executing a flow from another application, lead and lag time required for flow of data between applications, constraints related to test executions, and logical dependencies, etc.

The Rules Engine applies these rules to the Automation Repository's modular functions to create end-to-end flows that can be executed with large and/or carefully selected sets of data parameters. The Rules Engine ensures that tests belonging to it and their prerequisites are performed in their proper and expected order.

Whereas in conventional regression testing the test plan is always linear and predetermined, HVTA relies on stochastic (i.e. random in both content and sequence) testing, where efficacy results from the unpredictability. This unpredictability can take different forms, but the most common form is sequence. One common HVTA technique involves running established regression tests out of normal order.

The Test Orchestration Engine (TOE) organizes the overall test sequence depending on the type of testing being performed (i.e. the type of HVTA test). In cases where randomization is being employed (e.g. in extended randomized regression testing, where complete test flows are performed, but in a different and unpredictable order compared to the standard regression; or in one of the three types of state-transition testing, etc.), the Test Orchestration Engine manages the process to achieve randomization of various types while also tracking test coverage.

In some cases where testing is not being randomized, the Test Orchestration Engine also manages the overall test process. For example, in the case of function equivalence testing, the Test Orchestration Engine may identify and schedule the test required, making use of other test flows in the Automation Repository. As another option, the Test Orchestration Engine may evaluate linear, non-randomized executions based on heuristic predictions.

The Execution Environment Monitor watches for lower level failures or causes for concern during routine and seemingly successful regression tests. Examples of such errors include memory leaks, resource utilization, and stack overflows. The Execution Environment Monitor proactively monitors for any failure outside the system under test 206, which may have been caused, directly or indirectly, by the system under test 206. This involves not only monitoring the testing environment in detail in real time, but also comparing current diagnostic data against previously saved diagnostic data in order to flag potential correlations.

Thus, the testing system 204 focuses on automation testing applications and harnessing their power to create multiple scenarios for end-to-end coverage in an enterprise environment. The testing system 204 implements an automated test repository and end-to-end flow generation that can be executed via automation. The testing system 204 may span multiple applications or platforms and distinguish between application-specific flows and generic flows that can be used on multiple systems under test.

In various embodiments, the testing system 204 may implement an HVTA testing subsystem and/or any functionality associated therewith. Such functionality may include maintaining all tests containing the different types of HVTA testing techniques that have been identified at a high level. These techniques are all extremely different from each other, and perhaps more will be found in the future.

Such functionality may also include analyzing existing tests captured for the system under test and matching them with known HVTA techniques. The testing system 204 may also generate HVTA tests based on the current test resources for the system under test. In one embodiment, the testing system 204 may generate some of the artifacts needed to give the tester a head start in the event that the testing must be performed using a third party tool or manual technique.

Figure 3:
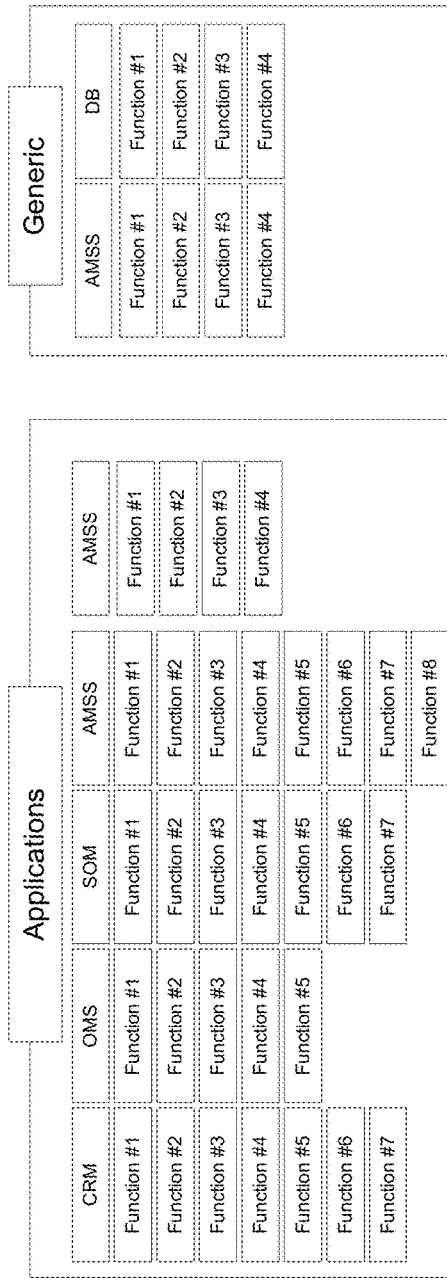
FIG. 3 shows a diagram illustrating a data structure example stored in a Modular Function Automation Repository associated with a testing system, in accordance with one embodiment.

FIG. 3 shows a diagram 300 illustrating a data structure example stored in the Modular Function Automation Repository, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

The diagram 300 shows a view of an automation repository categorization. As shown, function blocks are categorized as application specific or as a generic automation function.

Based on the categorization performed by the Rules Engine, the Automation Repository may reorganize and/or refactor existing flows on an ongoing basis to eliminate redundancy.

Figure 4:
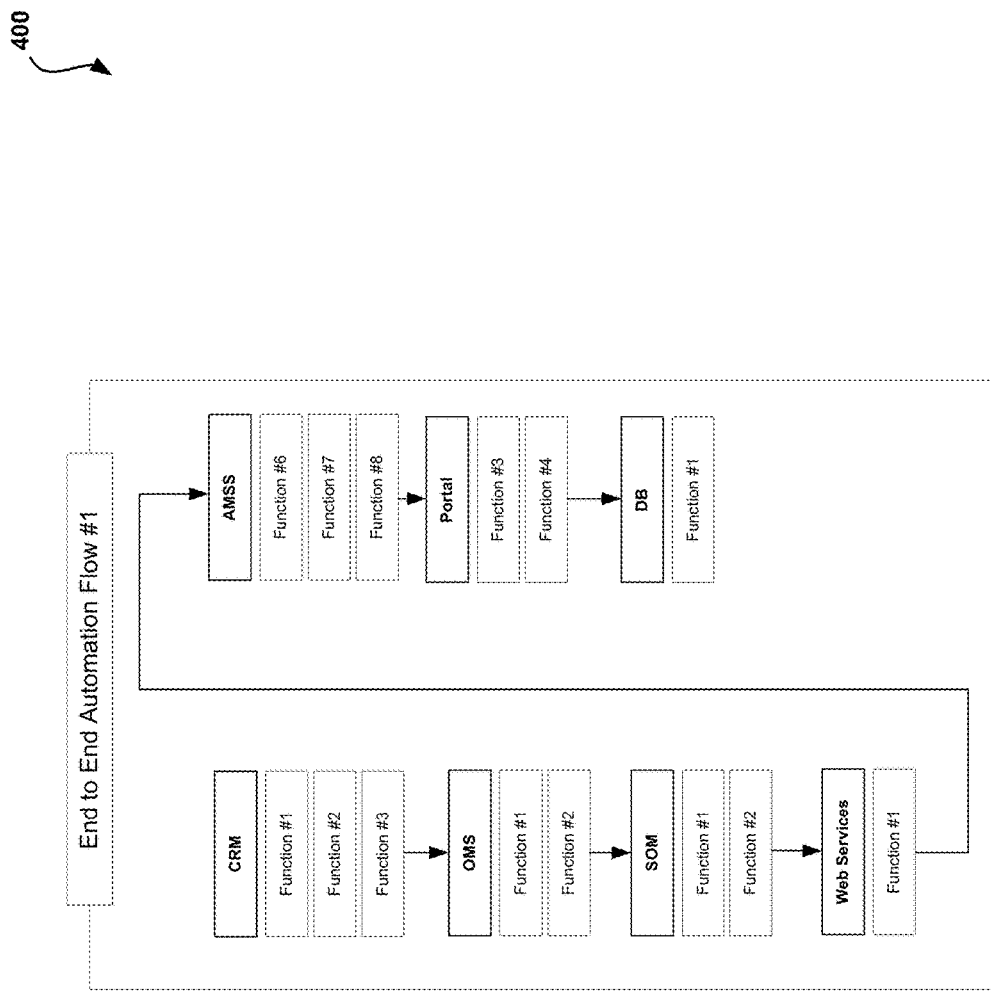
FIG. 4 shows a diagram illustrating a test flow example created by a Dependency Rules Engine associated with a testing system, in accordance with one embodiment.

FIG. 4 shows a diagram 400 illustrating a test flow example created by the Rules Engine, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

The diagram 400 shows an example of an end to end automated flow created considering internal and external dependencies. The Rules Engine applies dependency rules to modular functions stored in the Automation Repository to create end-to-end flows that can be executed with large sets of data parameters. The Rules Engine ensures that tests are performed in a proper and expected order.

Figure 5:
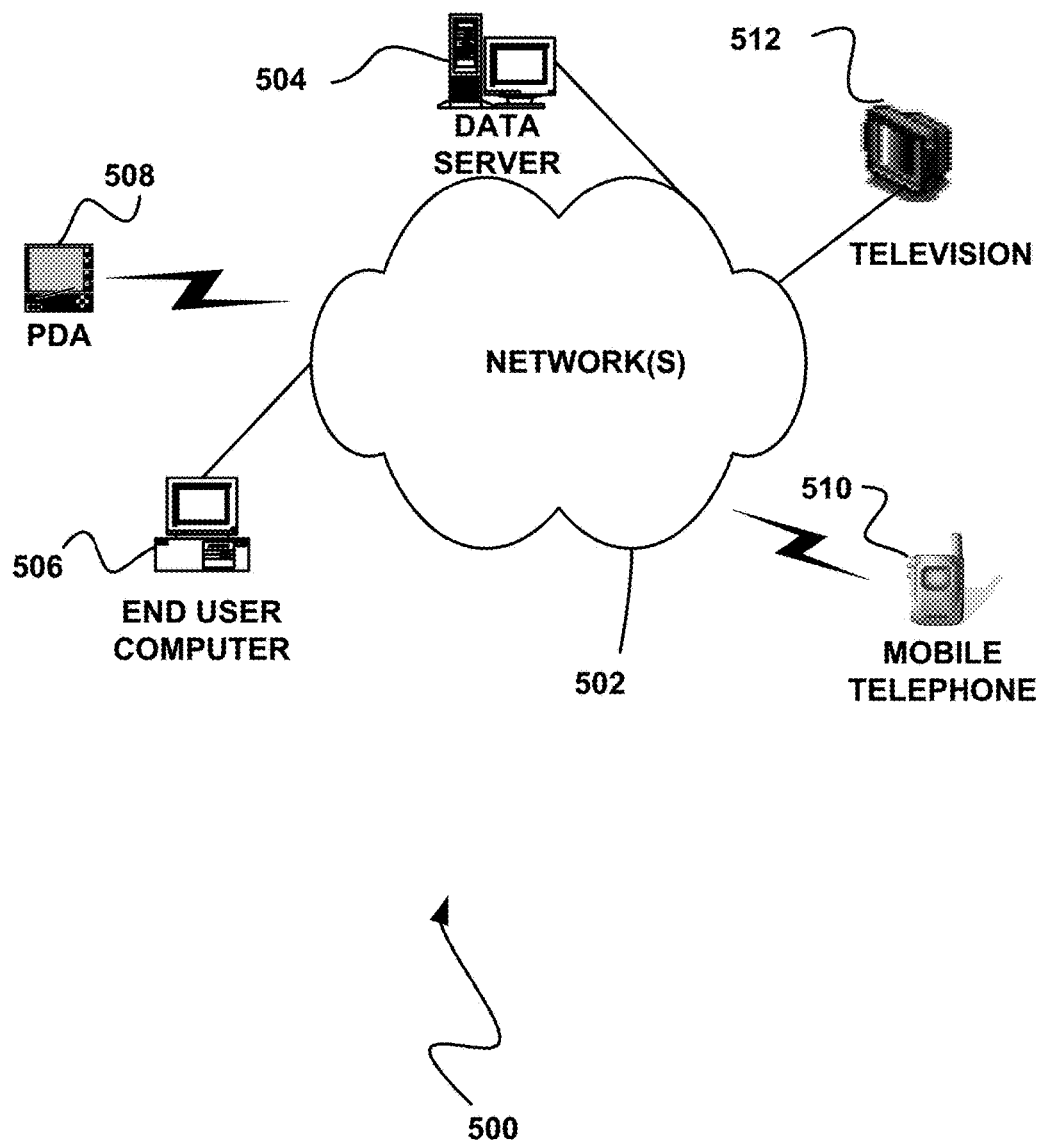
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, and/or any Internet of Things (IoT) device, etc.

Figure 6:
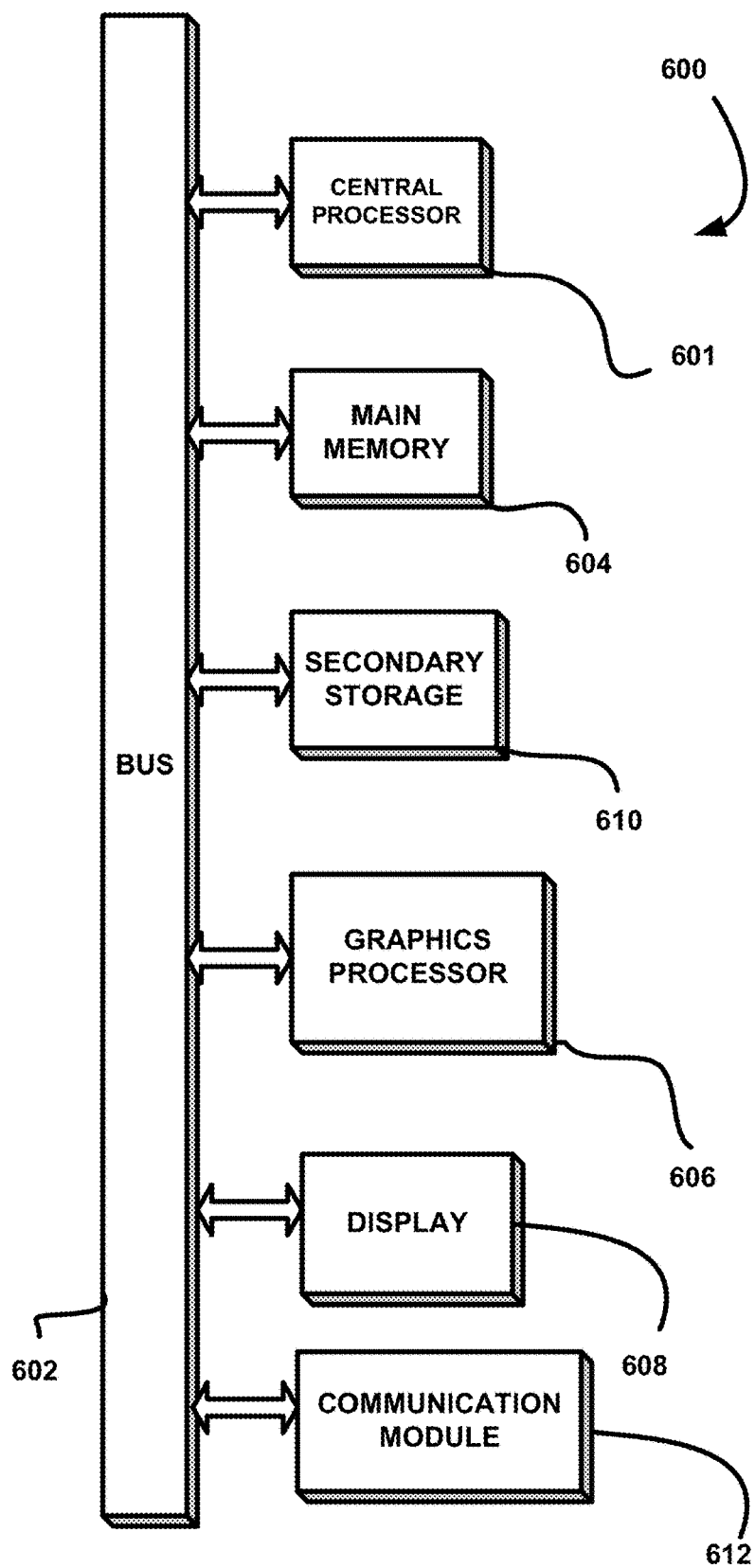
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    identifying, by a testing system, at least one High Volume Test Automation (HVTA) test to perform on a system under test as part of a testing project;
    identifying, by the testing system, a plurality of generic test functions in an automation repository that are applicable to the at least one HVTA test;
    identifying, by the testing system, dependency rules associated with the plurality of generic test functions;
    generating, by the testing system, at least one test flow utilizing the plurality of generic test functions, based on the dependency rules associated with the plurality of generic test functions;
    organizing, by the testing system, an overall test sequence for the at least one HVTA test including the at least one test flow, based on a type of HVTA test to be performed;
    executing, by the testing system, the overall test sequence while monitoring a testing environment of the system under test in real time; and
    reporting, by the testing system, anomalies resulting from monitoring the testing environment of the system under test during the execution of the overall test sequence.

2. The computer program product of claim 1, wherein the at least one HVTA test includes extended random regression testing.

3. The computer program product of claim 1, wherein the at least one HVTA test includes function equivalence testing with comparison to a reference function.

4. The computer program product of claim 1, wherein the at least one HVTA test includes a comparison to a computational model.

5. The computer program product of claim 1, wherein the at least one HVTA test includes a comparison to a logical model.

6. The computer program product of claim 1, wherein the at least one HVTA test includes a comparison to a heuristic prediction.

7. The computer program product of claim 1, wherein the at least one HVTA test includes implementing a simulator with probes.

8. The computer program product of claim 1, wherein the at least one HVTA test includes state transition testing without a state model.

9. The computer program product of claim 1, wherein the at least one HVTA test includes state-transition testing using a state model.

10. The computer program product of claim 1, wherein the at least one HVTA test includes functional testing utilizing background stress.

11. The computer program product of claim 1, wherein the at least one HVTA test includes hostile data stream testing.

12. The computer program product of claim 1, wherein the at least one HVTA test includes utilizing random inputs to protocol checkers.

13. The computer program product of claim 1, wherein generating the at least one test flow includes generating all test scenario combinations for a set of the plurality of generic test functions.

14. The computer program product of claim 13, wherein generating the at least one test flow includes generating a strategic subset from all the test scenario combinations through combinatorial testing.

15. The computer program product of claim 1, further comprising computer code for identifying, by the testing system, a plurality of data parameters to be utilized during execution of the at least one test flow.

16. The computer program product of claim 15, wherein a set of parameter combining rules is utilized for identifying the plurality of data parameters.

17. The computer program product of claim 1, wherein the plurality of generic test functions include pre-recorded automation building blocks.

18. The computer program product of claim 1, wherein generating the at least one test flow utilizing the plurality of generic test functions includes combining two or more of the plurality of generic test functions into the at least one test flow utilizing at least one of a test scenario template or one or more test scenario build up rules.

19. A method, comprising:
   identifying, by a testing system, at least one High Volume Test Automation (HVTA) test to perform on a system under test as part of a testing project;
   identifying, by the testing system, a plurality of generic test functions in an automation repository that are applicable to the at least one HVTA test;
   identifying, by the testing system, dependency rules associated with the plurality of generic test functions;
   generating, by the testing system, at least one test flow utilizing the plurality of generic test functions, based on the dependency rules associated with the plurality of generic test functions;
   organizing, by the testing system, an overall test sequence for the at least one HVTA test including the at least one test flow, based on a type of HVTA test to be performed;
   executing, by the testing system, the overall test sequence while monitoring a testing environment of the system under test in real time; and
   reporting, by the testing system, anomalies resulting from monitoring the testing environment of the system under test during the execution of the overall test sequence.

20. A testing system comprising one or more processors for:
   identifying, by the testing system, at least one High Volume Test Automation (HVTA) test to perform on a system under test as part of a testing project;
   identifying, by the testing system, a plurality of generic test functions in an automation repository that are applicable to the at least one HVTA test;
   identifying, by the testing system, dependency rules associated with the plurality of generic test functions;
   generating, by the testing system, at least one test flow utilizing the plurality of generic test functions, based on the dependency rules associated with the plurality of generic test functions;
   organizing, by the testing system, an overall test sequence for the at least one HVTA test including the at least one test flow, based on a type of HVTA test to be performed;
   executing, by the testing system, the overall test sequence while monitoring a testing environment of the system under test in real time; and
   reporting, by the testing system, anomalies resulting from monitoring the testing environment of the system under test during the execution of the overall test sequence.

\* \* \* \* \*